United States Patent [19]

Gwozdz

[11] 3,725,973
[45] Apr. 10, 1973

[54] HINGE WITH RADIAL AND THRUST BEARINGS

[75] Inventor: Joseph W. Gwozdz, Clark Summit, Pa.

[73] Assignee: McKinney Manufacturing Company, Scranton, Pa.

[22] Filed: Oct. 28, 1970

[21] Appl. No.: 84,589

[52] U.S. Cl. ..........................16/136, 16/2, 308/135
[51] Int. Cl. ..........................E05d 11/04, B65d 7/48
[58] Field of Search..................................16/136, 2; 308/DIG. 7, 174, 135

[56] References Cited

UNITED STATES PATENTS 3,499,183  3/1970  Parsons..................................16/136
3,106,991  10/1963  Winge..............................308/DIG. 7
3,117,827  1/1964  Cecala..................................16/151

Primary Examiner—Bobby R. Gay
Assistant Examiner—Doris L. Troutman
Attorney—Brown, Murray, Flick and Peckham

[57] ABSTRACT

A hinge leaf knuckle has in at least one end a socket around the pin that connects two leaves together. Fitting in this socket around the pin is a thrust bearing retainer that has a base engaging the inner end of the socket and the pin to form a radial bearing. The retainer side wall is spaced from the pin. A thrust bearing is disposed in the retainer around the pin and projects from the socket and retainer into engagement with the adjoining knuckle. At least one of these bearings is an anti-friction plastic. Preferably, both are.

12 Claims, 7 Drawing Figures

PATENTED APR 10 1973 3,725,973

INVENTOR
JOSEPH W. GWOZDZ
BY Brown, Murray, Flick & Peckham
ATTORNEYS

HINGE WITH RADIAL AND THRUST BEARINGS

Plastic bearings in hinges are not new, but heretofore the radial bearing and the thrust bearing have been combined in a single bushing. This has required either that the end surface of the knuckle engaging the bushing be machined, or that the knuckle be counterbored for receiving a metal or plastic bearing to engage the plastic bushing. Either of these operations adds to the cost of the hinge.

It is among the objects of this invention to provide a hinge that does not require precision machining of end surfaces of knuckles, that reduces counterboring to a minimum, and that is provided with inexpensive and quickly applied radial and thrust bearings.

The invention is illustrated in the accompanying drawings, in which.

Figure 1:
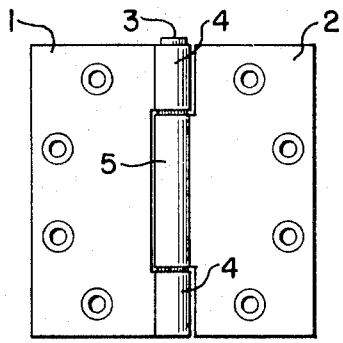
FIG. 1 is a side view of a hinge.
Figure 2:
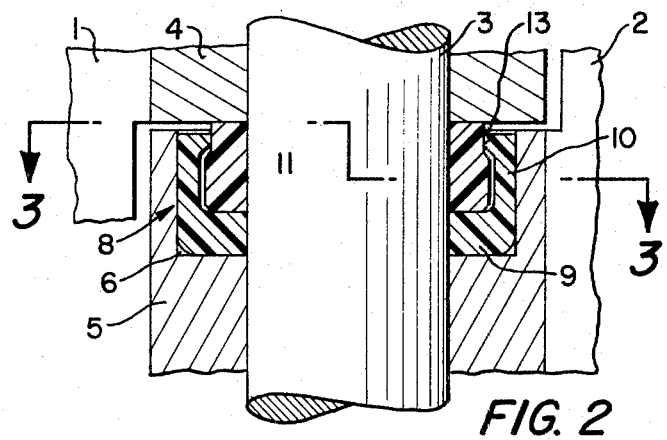
FIG. 2 is an enlarged fragmentary vertical section.
Figure 3:
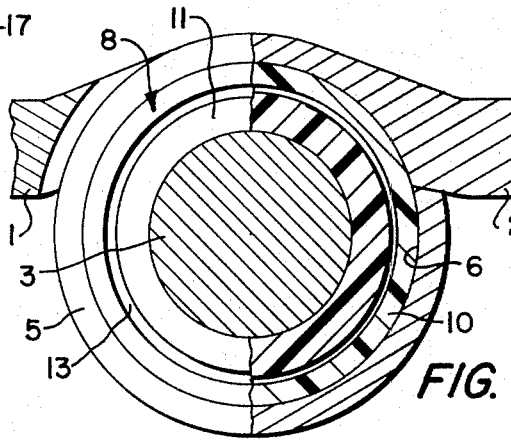
FIG. 3 is a cross section taken on the line 3—3 of FIG. 2.

Referring to FIGS. 1, 2 and 3 of the drawings, a hinge has two leaves 1 and 2 provided with interfitting knuckles connected by the usual hinge pin 3. The number of knuckles is not important, the hinge shown having two vertically spaced knuckles 4 on one leaf and a central knuckle 5 on the other leaf. The hinge is provided with bearings at the upper and lower ends of the center knuckle. In each location there is a radial bearing and a thrust bearing. These can be mounted in the upper and lower knuckles, but it is preferred to mount them in the opposite ends of the center knuckle. Accordingly, the ends of that knuckle are counterbored to provide them with sockets 6 around the hinge pin, as shown in FIG. 2.

Inserted in each socket is a thrust bearing retainer 8 that fits snugly in place and has a base 9 engaging the inner end of the socket and the pin to form a radial bearing. The side wall 10 of the retainer extends outwardly along the side of the socket, which it engages. It is spaced from the pin. Disposed in the retainer around the hinge pin is a ring that forms a thrust bearing 11 which projects from the retainer and also from the socket and engages the adjoining end of the adjacent knuckle 4. This thrust bearing is rotatably mounted in the retainer and engages flat against the adjoining surface of the retainer base 9. The thrust bearing takes the vertical load while the radial bearing takes the horizontal or radial load.

In order to hold the two bearings together during assembly with the hinge and whenever the hinge pin is removed and the two leaves of the hinge are separated, the outer end of the radial bearing or retainer is provided with an inwardly projecting lip 13 that encircles the thrust bearing and substantially engages it, and the diameter of the thrust bearing between the lip and the base of the retainer is made greater than the internal diameter of the lip. Consequently, the thrust bearing is locked in the retainer by means of the lip. The two parts can be snapped together before being inserted in the knuckle socket. This is possible because at least one of the parts is molded from a plastic and will yield sufficiently to allow the thrust bearing to be pressed into the retainer. However, this is not the principal reason for making one or both parts of the bearing assembly from a plastic. If the retainer is made of metal and the thrust bearing of plastic, the base surface of the retainer that is engaged by the thrust bearing can readily be made smooth enough for the thrust bearing to rotate on it satisfactorily. On the other hand, if the retainer is made of a plastic and the thrust bearing is made of metal, the inner end of the thrust bearing can easily be provided with a smooth surface when the bearing is made.

Preferably, however, both elements are made of an anti-friction plastic as they can be molded very cheaply with smooth bearing surfaces and easily snapped together. Such plastics as nylon, Delrin or Teflon are satisfactory. No lubrication is required and the bearings have an extremely long life.

Figure 4:
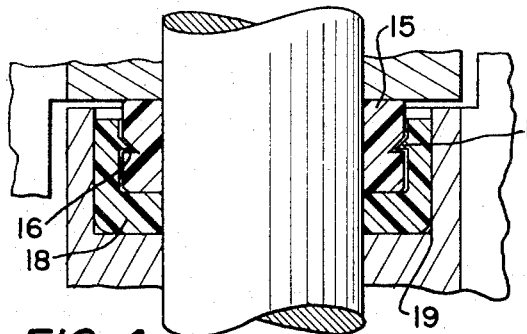
FIG. 4 is a view similar to FIG. 2 of a modification.

In the modification shown in FIG. 4, the thrust bearing 15 has a uniform diameter from end to end, except for a peripheral groove 16 around it. This groove receives a lip 17 projecting inwardly from the side wall of a retainer 18 similar to the one first described. For ease of application, the outer face of the lip converges toward the inner end of knuckle socket 19, but its inner face is in a substantially radial plane to engage a parallel surface in the groove and thereby prevent the two elements from separating after assembly.

Figure 5:
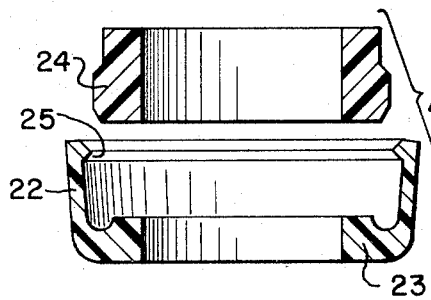
FIG. 5 is a vertical section through further modified radial and thrust bearings before insertion in a hinge knuckle.
Figure 6:
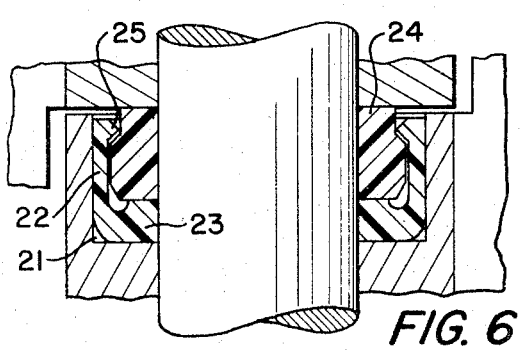
FIG. 6 shows the bearings of FIG. 5 in place.

In the next embodiment, FIGS. 5 and 6, which is very much like the first one while in the knuckle socket 21, the retainer originally has an outwardly flaring side wall 22 that is tapered in thickness toward its base 23 to facilitate bending of the wall where it joins the base. The flaring side wall is compressed inwardly into cylindrical form when the retainer is pressed into the knuckle socket. The thrust bearing 24 is placed in the retainer just before or as the retainer is being inserted in the socket, so that the lip 25 on the retainer will overly the larger diameter inner end of the thrust bearing when the retainer is seated in place.

Figure 7:
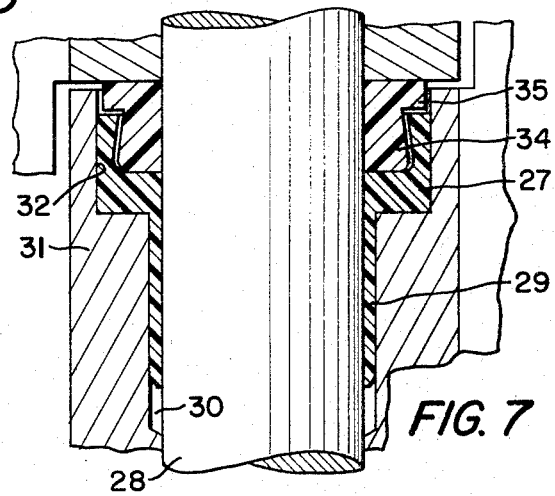
FIG. 7 illustrates another embodiment of the invention.

In the last modification, shown in FIG. 7, the surface area of the retainer or radial bearing 27 that engages the hinge pin 28 is increased by providing the base of the retainer with an integral cylindrical extension or neck 29 that fits in a recess 30 in the wall of the passage through the knuckle 31 at the inner end of the socket 32. This also increases the friction between the retainer and the knuckle for securely holding the retainer in place. This embodiment of the invention also illustrates a slightly different way of holding the thrust bearing in place, and also a different thrust bearing 34. Thus, the inner surface of the side wall of the retainer diverges inwardly, while the outside of the thrust bearing diverges in the same direction. The inner diameter of the outer end of the retainer is slightly less than the outer diameter of the inner end of the thrust bearing, so the two elements will not separate after having been snapped together. Instead of having the thrust bearing extend straight out of the retainer, this thrust bearing has an encircling flange 35 at its outer end that overlies the side wall of the retainer, thereby creating a larger area of contact with the end of the adjoining knuckle. The side wall of the retainer can be made cylindrical initially and then the thrust bearing snapped into it, or the side wall originally can flare out and be compressed into cylindrical form as it is inserted in the knuckle socket, with the thrust bearing already seated on the base of the retainer.

In all of these modifications, at least one of the two interfitting bearings is molded from a plastic, but for best results both are made from a plastic.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A hinge comprising a pair of hinge leaves provided with interfitting knuckles, a hinge pin extending through the knuckles to connect the two leaves together, a knuckle having in one end a socket around said pin, a thrust bearing retainer fitting in said socket around the pin and having a base engaging the inner end of the socket and the pin to form a radial bearing, the retainer also having a side wall extending from its base outwardly in the socket around the pin, and a thrust bearing in said socket encircling the hinge pin in overlapping relation with the side of said retainer side wall and projecting from said socket and retainer into engagement with the adjoining knuckle, at least one of said bearings being a plastic, the thrust bearing having an end surface seating against said retainer base in sliding engagement therewith.

2. A hinge according to claim 1, in which said thrust bearing is made of a plastic.

3. A hinge according to claim 1, in which both said thrust bearing and said retainer are plastics.

4. A hinge according to claim 1, in which said socket knuckle is provided with a recess around the pin extending inwardly from the socket, and said retainer base has an integral cylindrical extension forming a neck fitting in said recess and engaging the pin.

5. A hinge according to claim 2, in which said retainer side wall is provided with an inwardly projecting lip encircling the thrust bearing, and the thrust bearing is provided with a circumferential groove receiving the lip to lock the thrust bearing in the retainer.

6. A hinge according to claim 1, in which said retainer is made of a plastic, and the retainer side wall initially flares outwardly but is compressed radially when forced into said socket, whereby the retainer side wall presses outwardly against the socket side wall.

7. A hinge according to claim 1, in which said retainer side wall is provided with an inwardly projecting lip encircling the thrust bearing, and the diameter of the thrust bearing between said lip and the base of the retainer is greater than the inner diameter of the lip, whereby the thrust bearing and retainer are locked together.

8. A hinge according to claim 7, in which said lip has an outer surface converging toward the base of the retainer to facilitate snapping of the thrust bearing into the retainer.

9. A hinge according to claim 1, in which the outer end portion of the thrust bearing overlaps the outer end of the retainer.

10. A hinge according to claim 9, in which the inner surface of said retainer side wall converges toward the outer end of said socket, and the portion of the thrust bearing encircled by the retainer side wall diverges inwardly of the socket to hold the thrust bearing in the retainer 11. A hinge according to claim 1, in which the side wall of said bearing retainer is provided with a substantially radial lip, and the thrust bearing projects radially into the space between said lip and the base of the retainer to thereby lock the thrust bearing and retainer together.

12. A hinge according to claim 1, in which said bearing retainer is cup-like with its side wall engaging the side of said socket and spaced from the pin, and said thrust bearing is disposed in the retainer.

* * * * *